United States Patent
McMillen

(10) Patent No.: US 6,908,152 B2
(45) Date of Patent: *Jun. 21, 2005

(54) PUSH LUMBAR SUPPORT WITH FLEXIBLE PRESSURE SURFACE

(75) Inventor: Robert McMillen, Tecumseh (CA)

(73) Assignee: L & P Property Management Company, South Gate, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 10/020,688

(22) Filed: Dec. 14, 2001

(65) Prior Publication Data

US 2003/0111885 A1 Jun. 19, 2003

(51) Int. Cl.[7] ................................................. A47C 7/46
(52) U.S. Cl. ..................................................... 297/284.4
(58) Field of Search ....................................... 297/284.4

(56) References Cited

U.S. PATENT DOCUMENTS

| | | | |
|---|---|---|---|
| 1,182,854 A | | 5/1916 | Poler |
| 2,756,809 A | | 7/1956 | Endresen |
| 2,843,195 A | | 7/1958 | Barvaeus |
| 2,942,651 A | | 6/1960 | Binding |
| 3,106,423 A | * | 10/1963 | Schwarz ................. 297/284.4 |
| 3,378,299 A | | 4/1968 | Sandor |
| 3,490,084 A | | 1/1970 | Schuster |
| 3,492,768 A | | 2/1970 | Schuster |
| 3,724,144 A | | 4/1973 | Schuster |
| 3,762,769 A | | 10/1973 | Poschl |
| 3,948,558 A | * | 4/1976 | Obermeier et al. ...... 297/284.4 |
| 3,973,797 A | * | 8/1976 | Obermeier et al. ...... 297/284.4 |
| 4,014,422 A | | 3/1977 | Morishita |
| 4,136,577 A | | 1/1979 | Borgersen |
| 4,153,293 A | | 5/1979 | Sheldon |
| 4,156,544 A | | 5/1979 | Swenson et al. |
| 4,182,533 A | | 1/1980 | Arndt et al. |
| 4,295,681 A | | 10/1981 | Gregory |
| 4,313,637 A | | 2/1982 | Barley |
| 4,316,631 A | | 2/1982 | Lenz et al. |

(Continued)

FOREIGN PATENT DOCUMENTS

| | | | |
|---|---|---|---|
| AT | 401 497 | 9/1996 | |
| DE | 2040794 | 7/1971 | |
| DE | 206 4419 | 7/1972 | |
| DE | 29 47 472 | 8/1980 | |
| DE | 201 07 434 U1 | 11/2001 | ............ B60N/2/62 |
| EP | 0 006 840 B1 | 2/1982 | |
| EP | 0 169 293 B1 | 10/1988 | |
| EP | 0 322 535 A1 | 7/1989 | |
| EP | 0 485 483 B1 | 1/1994 | |
| EP | 0 434 660 B1 | 5/1995 | |
| EP | 0 540 481 B1 | 12/1995 | |
| EP | 0 662 795 B1 | 12/1996 | |
| EP | 0 702 522 B1 | 3/1997 | |
| EP | 0 696 251 B1 | 7/1997 | |
| EP | 0 746 219 B1 | 11/1998 | |

(Continued)

OTHER PUBLICATIONS

International Search Report for PCT/US02/39798, mailed Apr. 24, 2003.

*Primary Examiner*—Peter M. Cuomo
*Assistant Examiner*—Joseph Edell
(74) *Attorney, Agent, or Firm*—Dennis J. M. Donahue, III; Grant D. Kang; Husch & Eppenberger LLP

(57) ABSTRACT

An ergonomic weight support device for a seat has a flexible pressure plate attached to an extending paddle for lumbar support. The paddle extends from a housing having a channel into which the paddle may be retracted for the lumbar support to be flat, or from which the paddle may be extended for lumbar support. The flexible pressure plate distributes lumbar supporting pressure across a greater area for comfort.

20 Claims, 4 Drawing Sheets

U.S. PATENT DOCUMENTS

| | | |
|---|---|---|
| 4,354,709 A | 10/1982 | Schuster |
| 4,390,210 A | 6/1983 | Wisniewski et al. |
| 4,449,751 A | 5/1984 | Murphy et al. |
| 4,452,485 A | 6/1984 | Schuster |
| 4,465,317 A | 8/1984 | Schwarz |
| 4,494,709 A | 1/1985 | Takada |
| 4,541,670 A | 9/1985 | Morgenstern et al. |
| 4,555,140 A | 11/1985 | Nemoto |
| 4,556,251 A | 12/1985 | Takagi |
| 4,561,606 A | 12/1985 | Sakakibara et al. |
| 4,564,235 A | 1/1986 | Hatsutta et al. |
| 4,565,406 A | 1/1986 | Suzuki |
| 4,576,410 A | 3/1986 | Hattori |
| 4,601,514 A | 7/1986 | Meiller |
| 4,602,819 A | 7/1986 | Morel |
| 4,627,661 A | 12/1986 | Ronnhult et al. |
| 4,632,454 A | 12/1986 | Naert |
| 4,676,550 A | 6/1987 | Neve De Mevergnies |
| 4,679,848 A | 7/1987 | Spierings |
| 4,730,871 A | 3/1988 | Sheldon |
| 4,880,271 A | 11/1989 | Graves |
| 4,909,568 A | 3/1990 | Dal Monte |
| 4,915,448 A | 4/1990 | Morgenstern |
| 4,950,032 A | 8/1990 | Nagasaka |
| 4,957,102 A | 9/1990 | Tan et al. |
| 4,968,093 A | 11/1990 | Dal Monte |
| 5,005,904 A | 4/1991 | Clemens et al. |
| 5,022,709 A | 6/1991 | Marchino |
| 5,026,116 A | 6/1991 | Dal Monte |
| 5,050,930 A | 9/1991 | Schuster et al. |
| 5,076,643 A | 12/1991 | Colasanti et al. |
| 5,088,790 A | 2/1992 | Wainwright et al. |
| 5,137,329 A | 8/1992 | Neale |
| 5,174,526 A | 12/1992 | Kanigowski |
| 5,186,412 A | 2/1993 | Park |
| 5,197,780 A | 3/1993 | Coughlin |
| 5,215,350 A | 6/1993 | Kato |
| 5,217,278 A | 6/1993 | Harrison et al. |
| 5,286,087 A | 2/1994 | Elton |
| 5,299,851 A | 4/1994 | Lin |
| 5,335,965 A | 8/1994 | Sessini |
| 5,385,531 A | 1/1995 | Jover |
| 5,397,164 A | 3/1995 | Schuster |
| 5,423,593 A | 6/1995 | Nagashima |
| 5,449,219 A | 9/1995 | Hay et al. |
| 5,452,868 A | 9/1995 | Kanigowski |
| 5,462,335 A * | 10/1995 | Seyler ................... 297/284.4 |
| 5,474,358 A | 12/1995 | Maeyaert |
| 5,498,063 A | 3/1996 | Schuster et al. |
| 5,518,294 A | 5/1996 | Ligon, Sr. et al. |
| 5,553,917 A | 9/1996 | Adat et al. |
| 5,553,919 A * | 9/1996 | Dennis ................... 297/284.4 |
| 5,562,324 A | 10/1996 | Massara et al. |
| 5,567,010 A | 10/1996 | Sparks |
| 5,567,011 A | 10/1996 | Sessini |
| 5,588,703 A | 12/1996 | Itou |
| 5,609,394 A | 3/1997 | Ligon, Sr. et al. |
| 5,626,390 A | 5/1997 | Schuster et al. |
| 5,638,722 A | 6/1997 | Klingler |
| 5,651,583 A | 7/1997 | Klingler et al. |
| 5,651,584 A | 7/1997 | Chenot et al. |
| 5,704,687 A | 1/1998 | Klingler |
| 5,718,476 A | 2/1998 | De Pascal et al. |
| 5,758,925 A | 6/1998 | Schrewe et al. |
| 5,762,397 A | 6/1998 | Venuto et al. |
| 5,769,491 A | 6/1998 | Schwarzbich |
| 5,772,281 A | 6/1998 | Massara |
| 5,775,773 A | 7/1998 | Schuster et al. |
| 5,791,733 A | 8/1998 | Van Hekken et al. |
| 5,816,653 A | 10/1998 | Benson |
| 5,823,620 A | 10/1998 | Le Caz |
| 5,857,743 A | 1/1999 | Ligon, Sr. et al. |
| 5,868,466 A | 2/1999 | Massara et al. |
| 5,884,968 A | 3/1999 | Massara |
| 5,897,168 A | 4/1999 | Bartelt et al. |
| 5,911,477 A | 6/1999 | Mundell et al. |
| 5,913,569 A | 6/1999 | Klingler |
| 5,934,752 A | 8/1999 | Klingler |
| 5,975,632 A | 11/1999 | Ginat |
| 5,984,407 A | 11/1999 | Ligon, Sr. et al. |
| 5,988,745 A | 11/1999 | Deceuninck |
| 6,003,941 A | 12/1999 | Schuster, Sr. et al. |
| 6,007,151 A | 12/1999 | Benson |
| 6,030,041 A | 2/2000 | Hsiao |
| 6,036,265 A | 3/2000 | Cosentino |
| 6,045,185 A | 4/2000 | Ligon, Sr. et al. |
| 6,050,641 A | 4/2000 | Benson |
| 6,079,783 A | 6/2000 | Schuster, Sr. et al. |
| 6,092,871 A * | 7/2000 | Beaulieu ................... 297/284.4 |
| 6,152,531 A | 11/2000 | Deceuninck |
| 6,152,532 A | 11/2000 | Cosentino |
| 6,158,300 A | 12/2000 | Klingler |
| 6,227,617 B1 | 5/2001 | Von Möller |
| 6,227,618 B1 | 5/2001 | Ligon, Sr. et al. |
| 6,254,186 B1 | 7/2001 | Falzon |
| 6,254,187 B1 | 7/2001 | Schuster, Sr. et al. |
| 6,270,158 B1 | 8/2001 | Hong |
| 6,296,308 B1 | 10/2001 | Cosentino et al. |
| 6,334,651 B1 | 1/2002 | Duan et al. |
| 6,619,739 B2 * | 9/2003 | McMillen ................ 297/284.7 |
| 6,652,029 B2 * | 11/2003 | McMillen ................ 297/284.4 |

FOREIGN PATENT DOCUMENTS

| | | | |
|---|---|---|---|
| EP | 0 797 399 B1 | | 11/1998 |
| EP | 0 698 360 B1 | | 3/2000 |
| FR | 2 596 334 | | 10/1987 |
| GB | 849 798 | | 9/1960 |
| GB | 1 423 617 | | 2/1976 |
| GB | 2 013 487 | | 2/1978 |
| GB | 2196530 A | * | 5/1988 |
| JP | 6165718 | * | 6/1994 |
| RU | 587924 | | 2/1978 |
| WO | WO/00/00064 | | 1/2000 |

* cited by examiner

PUSH LUMBAR SUPPORT WITH FLEXIBLE PRESSURE SURFACE

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

This invention relates generally to lumbar support devices, for seats.

2. Related Art

Lumbar supports and head rests for seats, particularly automobile seats, are known. Some prior art lumbar supports extend a paddle towards the seat occupant, See, e.g. U.S. patent application Ser. No. 09/798,657. Another type of lumbar support uses a mechanical extender to push a rigid pressure plate towards a seat occupant, See, e.g. U.S. Pat. No. 4,295,681.

These devices provide little flexibility in the surface of the support proximal to the seat occupant, because the contact surface is small, rigid and under pressure. Rigid pressure surfaces are less comfortable for the passenger.

Moreover, as seat designs are modified to incorporate more comfort devices, such as duct work for heating and cooling, the amount of space available inside seats for lumbar support devices shrinks. Smaller lumbar supports exacerbate the issue of pressure surface in flexibility.

There is a need in the art for a an ergonomic weight support which is more flexible at the surface applying pressure to the passenger, which occupies no more space than prior supports, and which is inexpensive and easy to manufacture and install.

SUMMARY OF THE INVENTION

This invention is a flexible pressure surface for ergonomic supports for seats, especially automobile seats. A pressure paddle is rotateably or slideably fixed at one end to a housing and free at the other end. Extension means push the free end of the paddle outwards to support a passengers back. The flexible pressure surface is fixed to the free end of the paddle. The flexible pressure surface broadens the area across which pressure is exerted, and flexes, diffusing the paddle pressure across a more comfortable range.

The present invention uses a relatively small number of moving parts which are simple in design and movement. It is compact in size for ease of packaging and ease of incorporation into a variety of different seats including automobile seats. It may be incorporated at various positions and in various orientations. The present invention is economical to manufacture, sell, assemble, maintain and operate. It may be operated by a motor, mechanical means or a combination of the two. More than one support device may be incorporated in a single seat for a plurality of ergonomic supports, including but not limited to lumbar supports, head/neck supports, or bolsters for rib support and/or thigh support.

The invention is able to tolerate excessive or abusive loads.

Further features and advantages of the present invention, as well as the structure and operation of various embodiments of the present invention, are described in detail below with reference to the accompanying drawings.

DETAILED DESCRIPTION OF THE PREFERRED EMBODIMENTS

Figure 1:
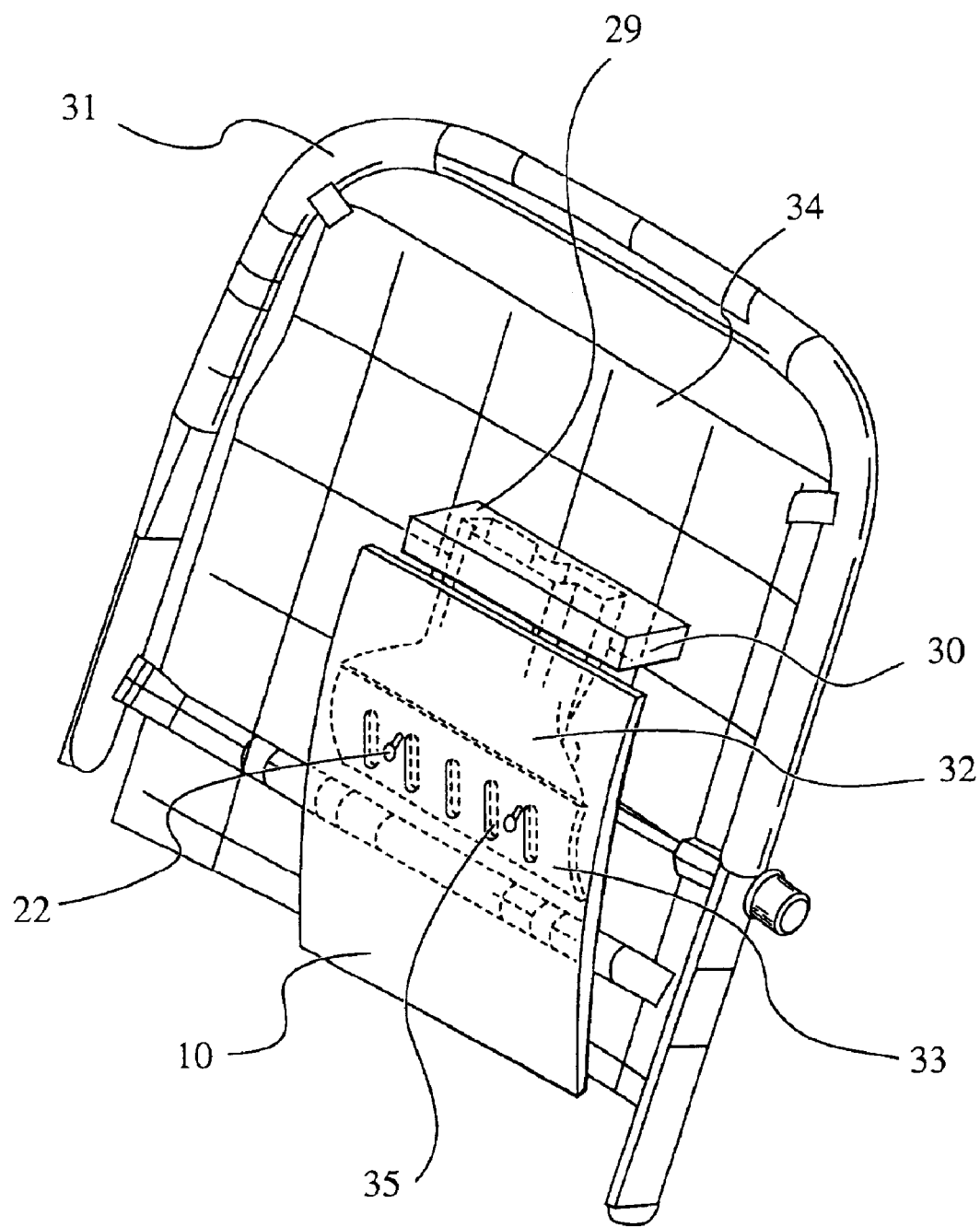
FIG. 1 is a front perspective view of the flexible pressure plate of the present invention combined with an extending paddle type lumbar support.

Referring to the accompanying drawings in which like reference numbers indicate like elements, FIG. 1 is a front view of the flexible pressure plate of the present invention in combination with an extending paddle type lumbar support. A housing, 30, is attached by any of a variety of conventional means to a seat frame, 31. In the depicted embodiment, the housing is attached to a back plate, 34, which is fixed to seat frame, 31. Extending from the housing is a lumbar support paddle, 32, which translates between a retracted, flatter position and an extended position. Extending paddle, 32, moves the pressure surface, 33, of paddle, 32, outwards towards seat occupant to provide lumbar support. The flexible pressure plate, 10, is permanently affixed to pressure surface, 33, of the paddle, 32. The pressure surface, 33, of the extending paddle, 32, may be curved. If so, the flexible pressure plate is attached at or near the transverse axis of the pressure surface closest to its apex. Fixation may be had by any conventional fixation means including without limitation bolts, screws, rivets, spot welds and the like, 22.

Flexible pressure plate, 10, of the present invention may be comprised of any flexible material, including metal, but is preferably plastic. Alternatively, it may be rigid. Preferably, it is curved and convex towards a seat occupant. Pressure surface, 33, may have holes, 35, in it to promote flexibility.

Figure 2:
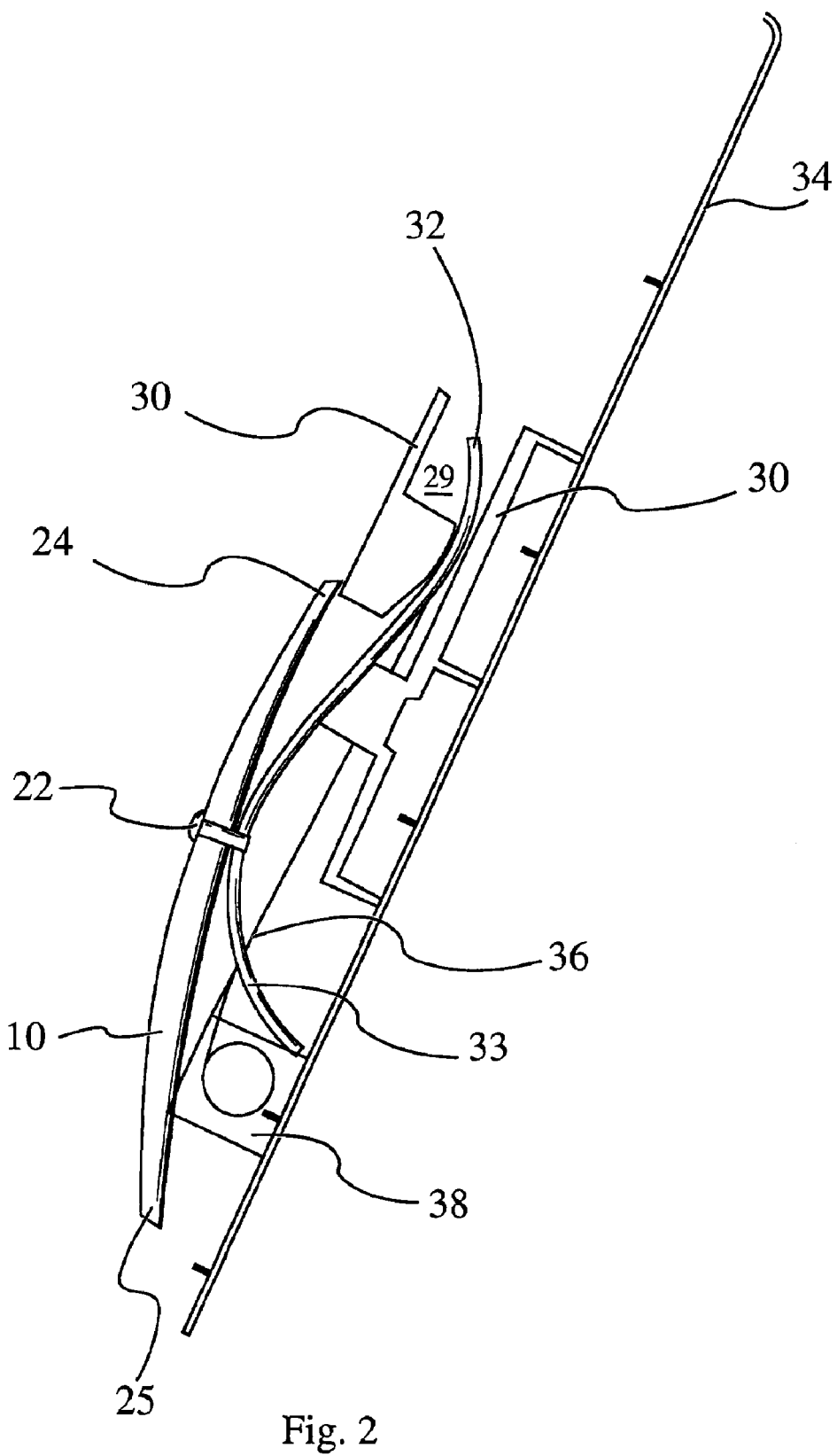
FIG. 2 is a side view of the flexible pressure plate of the present invention combined with a extending paddle type lumbar support unit in the retracted position.
Figure 3:
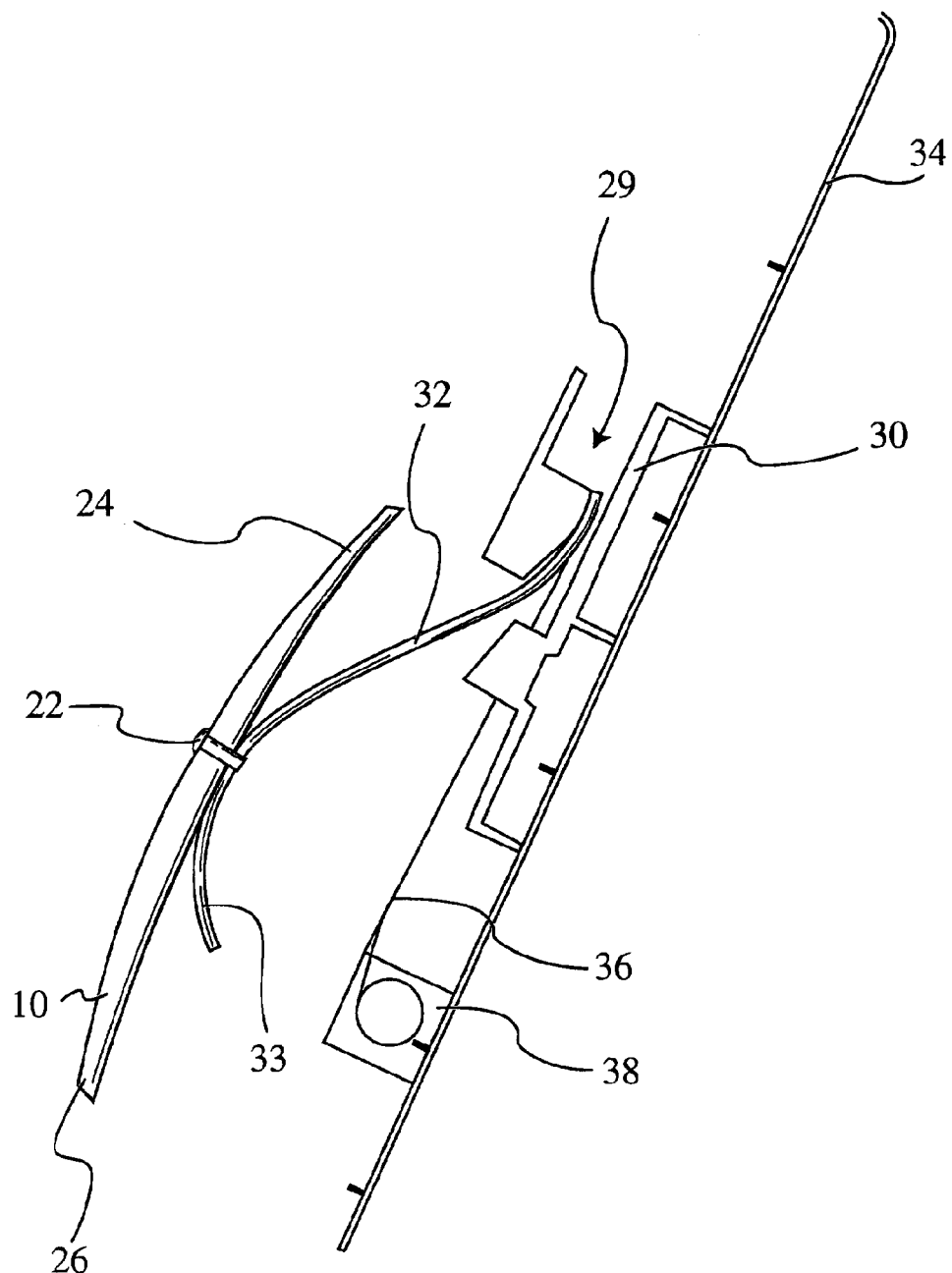
FIG. 3 is a side view of the flexible pressure plate of the present invention combined with an extending paddle type lumbar support in the extended position.

FIGS. 2 and 3 are side views of the flexible pressure plate of the present inventions, 10, incorporated with an extending paddle type lumbar support. Housing, 30 is affixed to the seat frame (not shown) by any o a variety of conventional means, such as a back plate, 34. (The housing, 30,is cut away in FIGS. 2 and 3.) From housing, 30, projects paddle, 32, which is arcuate in shape in order to achieve an extending motion towards the seat occupant upon movement of paddle, 32, outwards from housing, 30. Paddle, 32, extends out from housing, 30, projecting pressure surface, 33, out to support a passenger's lumbar spine. Paddle, 32, retracts back into its channel, 29, in housing, 30, to reduce lumbar support.

Actuating traction is typically by means of a cable, 36, anchored in housing, 38. Traction may be applied to the cable, 36, by mechanical means, at an opposite end of cable conduit (not shown). An electrical motor (not shown) can also pull the cable, 36. Again, the flexible pressure plate of the present invention, 10, is anchored at or near the apex of the pressure surface, 33, of paddle, 32, when it is in its extended position. Fixation is had by conventional means at 22.

Actuating traction is typically by means of a cable, 36, anchored in housing, 38. Traction may also be applied by any of the following elements: a wire, a bowden cable, a hard drawn wire, a pin, a rod, a bracket and/or a spoke. Communication between the extending element 32, and the actuator may also be via a piston, a screw, a rocker, a racket, a pin, a can, a lever or a cantilever.

Actuation may be achieved by a hydraulic device, a pneumatic device, a bowden cable, electric motor, or a mechanical device. Each of these actuation means, communication means and elements are well known to those skilled in the art.

It will be appreciated by those of skill in the art that the flexible pressure plate of the present invention may either be designed as in integral part of newly developed lumbar supports, and may also retrofitted to conventional lumbar supports. It is a further advantage of the present invention that it is simple to affix to pressure surfaces used in all lumbar supports and therefore efficient and economical in its assembly, distribution and installation.

The flexible pressure plate of the present invention promotes passenger comfort by spreading the force of the lumbar support over a greater vertical range, which is more ergonomically appropriate for the human spine which extends over a range greater in its vertical dimension than current lumbar supports.

The depicted alternative embodiment of the flexible pressure plate is tapered so that it is thicker at the apex of the lumbar support, at or near its fixation points, 22, and then tapers to a thinner depth as it approaches its upper edge, 24, and lower edge, 26. Such a design further promotes the flexibility of the pressure plate of the present invention. Of course plate, 10, may be flat as well, and/or have a uniform thickness.

The flexible pressure plate of the present invention is depicted as square in the figures. It is considered to be within the scope of the present invention for the flexible pressure plate to be any shape, including without limitation rounded, circular, elliptical, waisted, ribbed or otherwise.

In the depicted embodiment, the lumbar support is 40–50 millimeters thick (in rest position), 140–180 millimeters wide, and about 160 mm high. The lumbar support paddle extends about 50 millimeters; towards a passenger. The flexible pressure plate adds very little to the overall thickness of the lumbar support, but spreads the support over a greater area.

Figure 4:
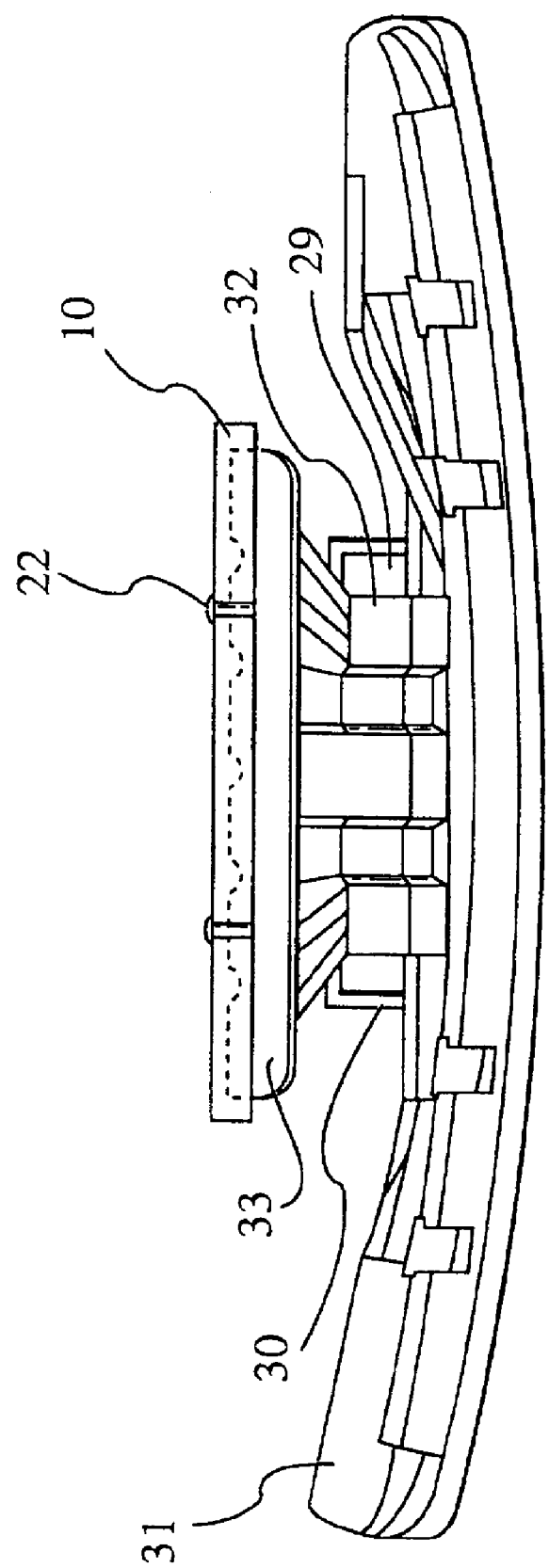
FIG. 4 is a bottom view of the present invention.

FIG. 4 is a bottom view of the flexible pressure plate, 10, installed on a push paddle, 32. The visible underside of push paddle, 32, depicts a series of ridges molded or stamped into the paddle to add rigidity to the portion of the paddle that slides in and out of channel, 29, in housing, 30. These ridges taper a flat surface at pressure surface end, 33. The ridges also engage guide bosses that define the channel, 29, within housing, 30.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

What is claimed is:

1. An ergonomic weight support apparatus for a seat comprising:
    a housing having an arcuate channel;
    an extending element having a pressure surface end, said pressure surface end being convex toward a seat occupant and being flexible in response to pressure, said extending element also having an arcuate encapsulated end slidingly disposed within said arcuate channel of said housing;
    said sliding disposition of said arcuate encapsulated end of said extending element in said arcuate channel being such that sliding travel of said arcuate encapsulated end of said extending element along said arcuate channel causes said pressure surface end of said extending element to extend outwards towards a seat occupant;
    an actuator anchored to said housing;
    a traction element having a first end engaged with said actuator and a second end in tractive communication with said arcuate encapsulated end of said extending element; and
    a pressure plate attached to said pressure surface end of said extending element;
    whereby said actuator mediates travel of said extending element between a retracted position and an extended, weight supporting position via application of a tractive force in a direction substantially collinear with said sliding travel of said arcuate encapsulated end of said extending element in said arcuate channel.

2. The ergonomic support of claim 1 wherein said traction element is selected from the group consisting of: a wire, a bowden cable, a hard drawn wire, a pin, a rod, a bracket and a spoke.

3. The ergonomic support of claim 1 wherein said extending element is comprised of plastic.

4. The ergonomic support of claim 1 wherein said housing is made of plastic.

5. The ergonomic support of claim 1 wherein said pressure plate is made of plastic.

6. The ergonomic support of claim 1 wherein said pressure plate has a medial axis that is attached to said pressure surface end of said extending element.

7. The ergonomic support of claim 6 wherein said pressure plate has an upper edge and a lower edge, said upper edge and said lower edge being attached to said extending element only through said attachment of said medial axis.

8. The ergonomic support of claim 7 wherein said pressure plate tapers from being thicker at said medial axis to being thinner at least one of said upper edge and said lower edge.

9. The ergonomic support of claim 6 wherein said medial axis is substantially horizontal.

10. The ergonomic support of claim 1 wherein said pressure plate is curvilinear.

11. The ergonomic support of claim 1 wherein communication between said extending element and said actuator is selected from the group consisting of: a piston, a screw, a rocker, a rack and pinion, a cam, a lever and a cantilever.

12. The ergonomic support of claim 1 wherein said actuator is selected from the group consisting of: a hydraulic device, a pneumatic device, a bowden cable, an electric motor and a mechanical device.

13. The ergonomic support of claim 1 wherein said pressure plate is substantially as wide as said pressure surface end of said extending element.

14. The ergonomic support of claim 1 wherein said pressure plate is substantially greater in height than said pressure surface end of said extending element.

15. The ergonomic support of claim 1 wherein said pressure plate is flexible.

16. A method of assembling a lumbar support comprising:
   disposing an arcuate encapsulated end of a extending element in an arcuate channel of a housing such that sliding travel of said arcuate encapsulated end through said arcuate channel extends a pressure surface end of said extending element in the direction substantially out from the plane of the seat back and toward the seal occupant, said sliding travel of said arcuate encapsulated end and said arcuate channel being substantially parallel with a plane of a seat back;
   mounting an actuator in a position to operatively communicate with said arcuate encapsulated end of said extending element;
   attaching a fraction element to said arcuate encapsulated end of said extending element and to said actuator such that said actuator mediates said sliding travel of said arcuate encapsulated end through arcuate channel, via a tractive force, said tractive force being substantially parallel with the plane of the back of the seat; and
   fixing a pressure plate to said pressure surface end of said extending element.

17. An ergonomic support device for a seat comprising:
   an arcuate channel;
   a paddle comprising a substantially rigid arcuate end and a convex pressure surface end, wherein said substantially rigid arcuate end slides within said arcuate channel between an inner position and an outer position and wherein said convex pressure surface end respectively rotates between a retracted position and an extended position, said inner position of said substantially rigid arcuate end corresponding with said retracted position of said convex pressure surface end and said outer position of said substantially rigid arcuate end corresponding with said extended position of said convex pressure surface end;
   an actuator operatively connected to said substantially rigid arcuate end of said paddle; and
   a pressure plate attached to said paddle proximate to said convex pressure surface end.

18. The ergonomic support of claim 17, wherein said convex pressure surface is substantially as wide as said pressure plate.

19. The ergonomic support of claim 17, wherein said convex pressure surface is flexible.

20. The ergonomic support of claim 17, further comprising a housing enclosing said arcuate channel.

* * * * *

UNITED STATES PATENT AND TRADEMARK OFFICE
CERTIFICATE OF CORRECTION

PATENT NO.    : 6,908,152 B2
DATED         : June 21, 2005
INVENTOR(S)   : Robert McMillen It is certified that error appears in the above-identified patent and that said Letters Patent is hereby corrected as shown below:

Column 5,
Line 15, reads "toward the seal" should read -- toward the seat --.
Line 22, reads "attaching a fraction" should read -- attaching a traction --.

Signed and Sealed this

Thirtieth Day of August, 2005

JON W. DUDAS
*Director of the United States Patent and Trademark Office*